RADIO DIRECTION FINDING SYSTEM

Filed March 28, 1955 3 Sheets-Sheet 1

Inventors
C. W. EARP-
D. L. COOPER-JONES
By R. P. Morris
Attorney

Inventors
C. W. EARP
D. L. COOPER-JONES
By [signature]
Attorney

Fig. 4

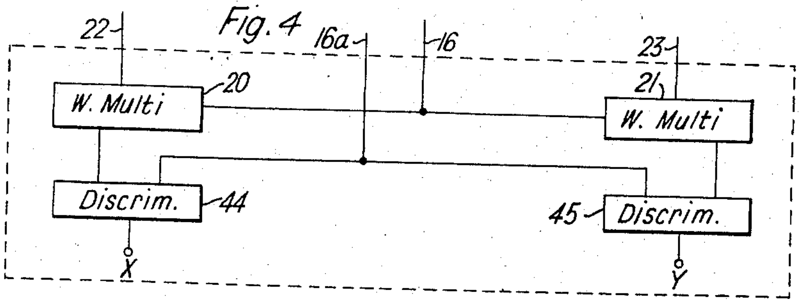

Fig. 5

(a) $\sin\{ft + \alpha \sin(pt + \theta)\}$ (b) $\sin.\{pt + \alpha \sin(pt + \theta)\}$ (c) $\sin(pt + \theta)$.

(d) $\sin(pt+\theta) . \sin pt = \frac{1}{2}\{\cos\theta - \cos(2pt+\theta)\}$ (e) $\sin(pt+\theta) . \cos pt = \frac{1}{2}\{\sin\theta + \sin(2pt+\theta)\}$ (f) $\sin Ft . \sin(pt+\theta) = \frac{1}{2}\{\cos(Ft-pt-\theta) - \cos(Ft+pt+\theta)\}$ (g) $\frac{1}{4}[\sin(Ft-\theta) + \sin(Ft+\theta) - \sin\{Ft-(2pt+\theta)\} - \sin\{Ft+(2pt+\theta)\}]$ (h) $\cos\theta - \cos(2pt+\theta) + \ldots\ldots$ (i) $\sin\theta + \sin(2pt+\theta) + \ldots\ldots$ Inventors
C. W. EARP-
D. L. COOPER-JONES
By [signature]
Attorney United States Patent Office 2,860,336 Patented Nov. 11, 1958

2,860,336

RADIO DIRECTION FINDING SYSTEM

Charles William Earp and Dennis Leslie Cooper-Jones, London, England, assignors to International Standard Electric Corporation, New York, N. Y.

Application March 28, 1955, Serial No. 497,264

Claims priority, application Great Britain May 21, 1954

6 Claims. (Cl. 343—120)

This invention relates to radio direction finding systems of the type in which the directional information is obtained from the phase relationship between a reference wave and the modulation imposed on received energy by reason of its being collected by means of a scanning antenna system.

There are already known various radio direction finding systems which include an antenna movable along a closed path to set up a phase modulation the phase of which at a receiver relative to a locally generated wave is used for obtaining the direction and in some cases the sense of propagation, of the received waves. Such a system has been described and claimed in British Patent No. 594,530.

In many cases it is not feasible to rotate an antenna at any reasonable gyration speed, at the value of radius which would be required for operation in the high frequency wave band. In order to overcome this difficulty, direction finding systems have been produced in which the ideal rotating antenna is simulated by placing a plurality of antennae symmetrically round the circumference of a circle and commutatively coupling the antennae one at a time to the receiver, the period of one complete cycle of commutation corresponding to one complete gyration of the ideal antenna. With such an arrangement the high frequency input to the radio receiver is a carrier wave the phase of which is modulated in steps instead of being smoothly modulated in accordance with a sine wave as would be the case with a single mechanically rotated antenna. In both the ideal case and the commutation case the phase demodulation is preferably carried out at intermediate frequency.

In all these known systems there has been the disadvantage (under certain operating conditions) that owing to the time constants associated with the integrating circuits which follow the phase demodulator there is a definite delay between the presentation of the bearing information on the display system and the time of arrival of the signal at the antenna system. Moreover, the bearing so obtained will not necessarily be correct for signals of duration so short as to be of the order of the period of commutation round the array, since several cycles of such commutation may be necessary in order to obtain a bearing wave of sufficiently stable phase condition for comparison with the locally generated reference wave. Difficulty also occurs when singals from different stations but of comparable strength are present simultaneously.

It is therefore an object of the present invention to provide a system which can yield a display with sufficiently high speed to overcome the disadvantages above mentioned. This object is achieved according to the present invention by the provision of a radio direction finding system comprising an antenna arrangement adapted to scan the radio field in cyclical succession round a circular path, radio receiving means coupled to said antenna arrangement and adapted to derive from the received energy a carrier wave which is phase modulated by reason of said scanning, means for producing two reference waves isochronous with said scanning but in phase quadrature with each other, and an analysing arrangement responsive to all said waves jointly and adapted to derive therefrom two coordinate potentials for application to respective quadrature input circuits of a direction-indicating device e. g. a cathode ray oscillograph, said analysing arrangement including wave multiplying means and phase discriminating means.

According to one feature of the invention there is provided a radio direction finding system comprising a circular array of at least three equally spaced antenna, radio receiving means, commutating means arranged to couple each of said antenna to said receiving means in turn in regular succession round the array at a given commutation frequency, means for deriving from the received radio energy a carrier wave which is phase modulated in steps by reason of said commutative coupling, means for producing two reference waves isochronous with said commutative scanning but in phase quadrature with each other, and an analysing arrangement responsive to all said waves jointly and adapted to derive therefrom two coordinate potentials for application to respective quadrature input circuits of a direction indicating device e. g. a cathode ray oscillograph, said analysing arrangement including wave multiplying means and phase discriminating means.

The invention will be better understood from the following description of several embodiments read in conjunction with the accompanying drawings, in which.

Figure 1:
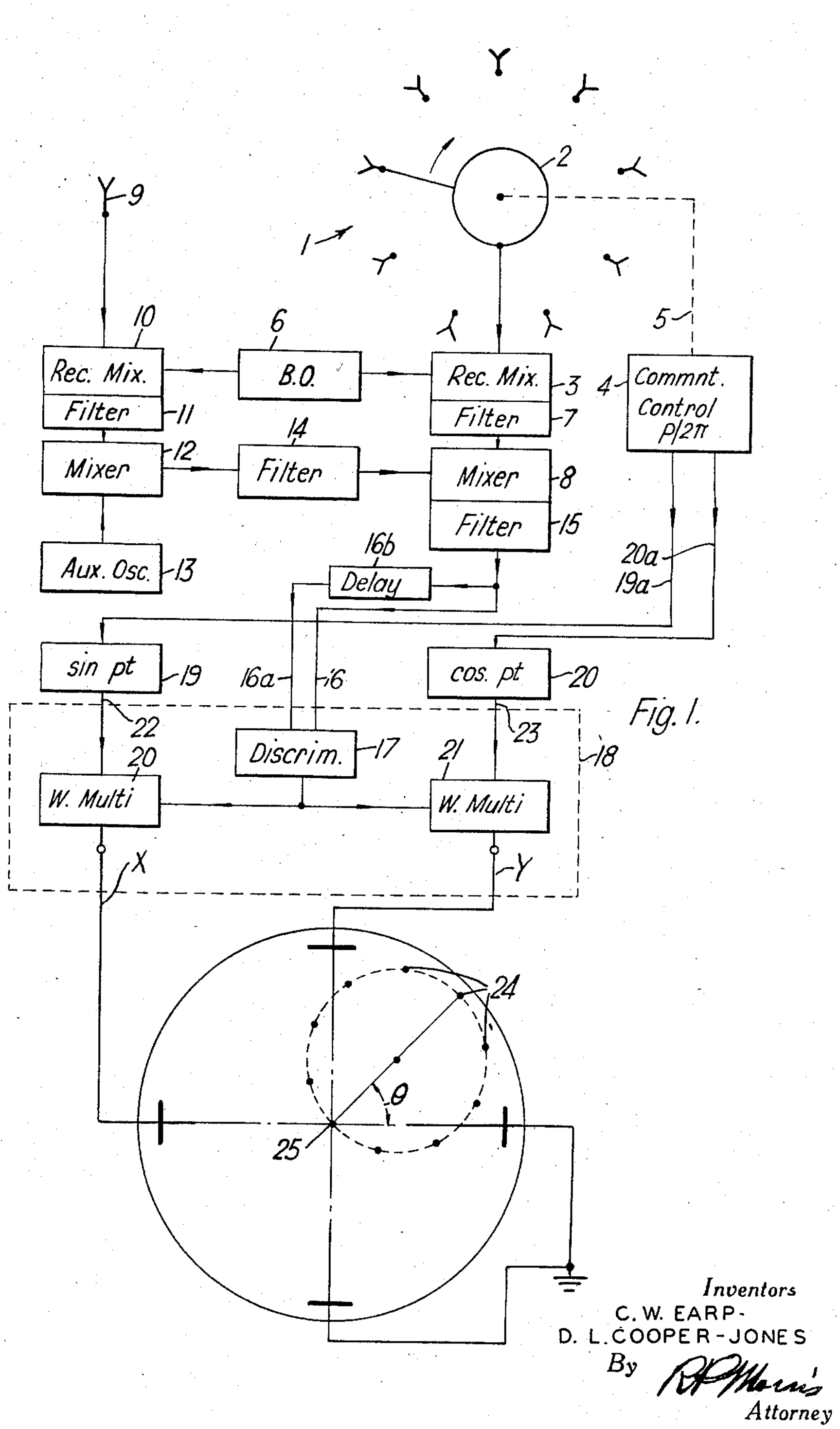
Fig. 1 illustrates one embodiment of the invention suitable for signals of either coherent or incoherent phases.

Fig. 4 illustartes another analysing arrangement alternative to that included in Fig. 1; and Fig. 5 is a list of mathematical expressions and equations used in explanation of the operation of the invention.

Referring now to Fig. 1, which illustrates the essential elements of a short wave direction-finding station in accordance with the invention, there is indicated at 1 an array of nine antennae uniformly spaced round the circumference of a circle of radius R. The individual antennae of array 1 are commutatively coupled one at a time, in regular succession round the circle at a given frequency $p/2\pi$, by means of commutator switch 2 to an input circuit of a receiver mixer 3. Commutator switch 2 is operated by the output from a commutation control unit 4, to which it is coupled by means symbolised by the dashline 5, the frequency $p/2\pi$ of complete commutation round the array being in the present instance 111.1 C./S., each antennae in turn being coupled to mixer 3 for a period of one millisecond. The commutator switch 2 may be of any suitable type, either electro-mechanical or electronic; the nature of the control unit 4 will of course depend upon the type of commutator switch actually used. Suitable commutating and controlling arrangements are disclosed in, for example, the specification of British Patent No. 594,530 to which reference may be made for a detailed description of these items.

Mixer 3, in addition to receiving the energy picked up in the antenna system 1, is fed with beating oscillator energy from oscillator 6, whereby the signal is converted to an intermediate frequency which is selected by means of intermediate frequency filter 7. The combination of mixer 3, oscillator 6 and filter 7 constitutes in effect one channel of a two-channel radio receiver. The output of this channel is fed to an input circuit of a second mixer 8.

In addition to the commutated antenna array 1 there is provided a single reference antenna 9, whose location is discussed hereinafter, coupled to an input circuit receiver mixer 10. The latter also receives input from beating oscillator 6, so that the energy received over antenna 9 is frequency-changed to the same intermediate frequency as is the commutated antenna energy fed to mixer 3. The desired intermediate frequency output from mixer 10 is selected by intermediate frequency filter 11. The combination of mixer 10, oscillator 6, and filter 11 constitutes in effect a second channel of the radio receiver. The output of this second channel is fed to an input circuit of mixer 12, which also receives energy from an auxiliary oscillator 13 of fixed frequency $P/2\pi$. This auxiliary oscillator frequency is determined primarily by the value of the intermediate frequency taken from mixers 3 and 10, and is preferably of the order of one fifth thereof. Auxiliary oscillator 13 is preferably of a frequency-stabilised type, such as a crystal controlled oscillator.

The output of mixer 12 comprises upper and lower sets of sidebands resulting from beats between the intermediate frequency input from filter 11 and the input from auxiliary oscillator 13. One set of these sidebands, say the upper set, is selected by filter 14 and applied to an input circuit of mixer 8, in which it beats with the intermediate frequency energy derived from the commutated array 1 via mixer 3 and filter 7. The output of mixer 8 includes, among other components, a wave corresponding to the frequency difference between the input from filter 14 and that from filter 7. This wave is selected by filter 15 and is of frequency $P/2\pi$, identical with that of the stabilised auxiliary oscillator 13, and of phase which varies in accordance with the instantaneous difference between the phase of the energy delivered to mixer 3 by the commutated antenna array 1 and the phase of the energy delivered to mixer 10 by reference antenna 9. The output of filter 15 is thus a wave of mixer frequency $P/2\pi$ which is phase-modulated by reason of the commutation round the circular antenna array 1, at the commutation (scanning) frequency $P/2\pi$. The output of filter 15 is applied to the input circuits of a phase discriminator 17, which forms part of an analysing arrangement 18, over two paths indicated by connections 16 and **16*a*. The connection 16*a* includes a time delay network 16*b* having a delay substantially equal to the duration of one commutation step, in this case 1 millisecond, so that the waves applied to the discriminator input have a phase difference equal to that between the energy received on the immediately active antenna of array 1 and the energy which was received on that antenna of the array which was active one commutation step (i. e. 1 millisecond) earlier. Blocks 19 and 20 represent sources of two reference waves controlled by the commutation control unit 4 over lines 19*a* and 20*a* in such manner that the waves are both isochronous with the commutation cycle of the scanning antenna system 1, but differ from each other in phase by 90°. The analysing arrangement 18 includes, in addition to discriminator 17, two wave multiplying devices 20 and 21. Reference wave energy is supplied from source 19 to wave multiplier 20, over connection 22, for multiplication by part of the discriminator output energy. Reference wave energy from source 20 is applied over connection 23 to wave multiplier 21 for multiplication by another part of the discriminator output. The outputs of wave multipliers 20 and 21 at X and Y constitute coordinate potentials which may be applied to respective orthogonally related deflecting systems of a cathode ray oscillograph, on the screen of which they produce a trace, as shown in the form of an offset circle defined by a succession of spots, such as shown at 24. This circle is off-set from but passes through the origin 25 of the display on the screen, and the bearing of the received signal energy is unambiguously indicated by the polar co-ordinate of that diameter of the circle which includes the screen origin 25**. This display corresponds to steady angular deflection of the oscillograph beam in synchronism with the commutation around the antenna array tube, combined with radial deflection of the beam in accordance with the instantaneous amplitude and sense of the discriminator output.

In the foregoing description the time delay unit **16*b* has been described as having a time delay substantially equal to the duration of one commutation step; such a delay corresponds to a relatively small fraction of a commutation cycle (in the present example one-ninth), and also to a very large number of cycles of the input wave of frequency $P/2\pi$. It is to be understood that the exact value of the time delay should be made such that the input supplied to the analyser 18 over connection 16*a* is in the correct high frequency phase for operation of the discriminator in accordance with known practice. If necessary the phase adjustment may be obtained by means of a separate phasing unit in series with delay unit 16*b* and adjustable over a range of one cycle at frequency $P/2\pi$. It will be clear that the discriminator operates in the same manner as when used in a frequency-modulation receiver, its output being a differential function of the stepped phase modulation at the output of filter 15**. In an embodiment of the invention using a rotated antenna instead of a commutated array the delay unit is still required, but the value of the delay may be very much smaller, of the order of as little as one period at the intermediate frequency.

Figure 2:
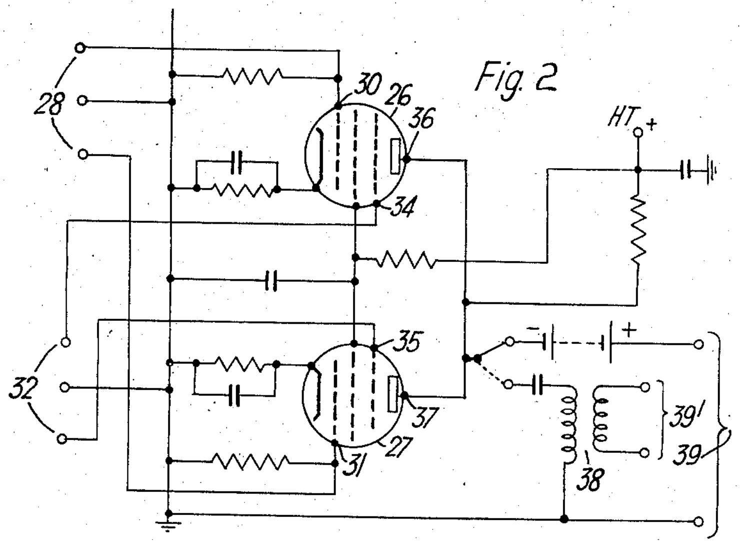
Fig. 2 illustrates a wave-multiplying arrangement suitable for use in embodiments of the invention.

A suitable form of wave multiplier is illustrated in Figure 2. As shown in this figure, the multiplier is of the balanced type, and comprises two pentode valves, 26 and 27. One of the two waves to be multiplied is applied at input terminals 28 for application in push-pull to like control grids 30 and 31 of valves 26 and 27. The other wave to be multiplied is applied to the input terminals 32 for application in push-pull to like control grids 34 and 35 of valves 26 and 27. The anodes 36 and 37 of the two valves are connected in parallel, and their output, is the product of the two input waves. When the multiplier is part of an analysing arrangement as shown at 18 in Fig. 1, the required anode output contains a D. C. term and is therefor taken off at terminals 39, if necessary through a backing voltage source such as a battery which balances out the normal anode working potential. In the case of analyser arrangements as described hereinafter with reference to Fig. 3 and Fig. 4, respectively, the required anode output contains no D. C. term and may therefore conveniently be taken off at terminals 39′ through an output transformer 38.

Returning to Figure 1, the phase-modulated wave applied to the analysing arrangement 18 is step-modulated at the commutation frequency with the amplitude of each step being proportional to the phase difference between the energy picked up by the reference antenna 9 and the energy simultaneously delivered by the array 1 to the receiver mixer 3. For best results, the reference waves derived from sources 19 and 20 are preferably themselves step-modulated in correspondence with the antenna commutation i. e. each reference wave comprises a train of pulses, one pulse per commutation step, with the envelope of the pulse amplitude constituting a sine or cosine wave of the scanning frequency, otherwise the circle trace on the oscillograph screen will exhibit a certain amount of irregularity which, while not sufficient to interfere with the bearing indication itself, may render it difficult to form a correct estimation of the quality of the bearing from the character of the display on the oscillograph screen.

It will be observed that the energies from the circular antenna array 1 and the single reference antenna 9 are converted to the same intermediate frequency without change of relative phase, since the frequency conversions in the two receiving channels are accomplished by the aid of one and the same beating oscillator 6. Whatever change occurs in the frequency or phase of oscillator 6 will affect the intermediate frequency outputs from both filters 7 and 11 to precisely the same extent. It will also be observed that, by beating the commutated antenna intermediate frequency output from filter 7 against the sideband wave energy resulting from beating the reference antenna intermediate frequency output from filter 11 against output from the auxiliary frequency stabilised oscillator 13, there is obtained at the output of filter 15, a wave which has the same frequency $P/2\pi$ as oscillator 13. It is to be particularly noted that any angular modulation which may have been applied to the energy at the dishtant transmitter does not appear as a modulation of the wave from filter 15, since such angular modulation would affect the energy received by the single reference antenna 9 to substantially the same extent as it would affect the energy picked up by the simultaneously connected one antenna of array 1, and would not modify the instantaneous phase difference between the two active antennae. The arrangement is, therefore, particularly suitable for dealing with signals of incoherent phase, such as signals from a keyed or pulsed oscillator, or with signals which are phase- or frequency-modulated at the transmitting source. Another advantage of the arrangement is that the signal to be discriminated by discriminator 17 always has the same central frequency $P/2\pi$ as that of the stabilised auxiliary oscillator 13, and it is therefore possible to use a sharply adjusted discriminator circuit, even although the frequency of the transmitter source is not stabilised.

It is also to be noted that since the output of reference antenna 9 (either direct or via filter 11) is independent of the array 1, it may be used to feed a suitable demodulating receiver to obtain the speech or other intelligence carried by the signal whose direction is being measured, no matter whether that signal is amplitude modulated or angularly modulated, without interference being set up by the commutation action.

The location of the reference antenna 9 is not critical, except that care should be taken that it does not react on the different antennae of array 1 and thereby create a species of site error. This possibility can be overcome by locating the reference antenna 9 sufficiently far from the nearest point of the array 1, as, for example, at twice the longest operating wavelength, to ensure that any reaction is negligible. Alternatively, and often more conveniently, the reference antenna 9 may be placed at the centre of the circular array 1.

The analysing arrangement 18 shown in Figure 1 has the merit of simplicity, but with "stepped" input waves which involve D. C. components distortion may arise owing to D. C. drift in the valves used in the wave multipliers. In order to avoid such distortion, the analysing arrangement 18 of Figure 1 may be replaced by that shown in Figure 4. In the arrangement shown in Figure 3, the output of discriminator 17 is applied to a balance amplitude modulator 40 which is supplied with a carrier of (high) frequency $F/2\pi$ by oscillator 41. The output from the balanced modulator comprises only the modulation sidebands arising from modulation by the discriminator output, and is applied to the wave multipliers 20 and 21. In wave multiplier 20, the sideband wave input is multiplied by the reference wave supplied from source 19 over connection 22, while in wave multiplier 21, the sideband wave input is multiplied by the reference wave from source 20 applied over connection 23. The outputs of the wave multipliers 20 and 21 are demodulated, together with an inserted carrier from oscillator 41, by means of balanced demodulators 42 and 43 respectively. The demodulator outputs constitute respective co-ordinate potentials which may be used as in the previous case.

Another analysing arrangement which avoids the drift trouble mentioned in connection with the analyser 18 of Fig. 1, is that illustrated in Fig. 4, in which the multiplication is applied to the phase modulated wave prior to any phase discrimination. In the arrangement of Fig. 4 the phase modulated energy incoming over connection 16 from filter 15 (Fig. 1), is applied to each of the wave multipliers 20 and 21 for multiplication thereon by respective quadrature reference waves of scanning (commutation) frequency. The outputs of the multipliers are then applied to respective discriminators 44 and 45 for discrimination against the comparison wave supplied over connection 16*a* in suitable phase and amplitude as explained hereafter. The outputs of the two discriminators provide respective co-ordinate potentials which may be used in precisely the same manner as the outputs from the wave multipliers in the analyser 18 of Fig. 1. In the analyser of Fig. 4 the discriminators 44 and 45 should be of a type the output of which is responsive both to amplitude changes and to phase changes in the input waves: this condition is met by the well known differential rectifier type of discrimination. It should be noted that there is no such limitation on the discriminator 17 shown in Figs. 1 and 3, which discriminator may be of any type which will extract the phase modulation envelope of the input waves, including arrangements which are responsive only to phase change but not to amplitude change.

The theoretical basis of direction finding systems according to the present invention will now be discussed with particular reference to the embodiment illustrated in Fig. 1, with its alternative analyser arrangements.

Returning to the analysing arrangement shown at 18 in Fig. 1, the manner in which the system operates will be understood from the following discussion, in which for the sake of simplicity smooth sine-wave scanning instead of step-wave scanning is assumed. This simplification is justified in that, as is well known, any stepped wave can be analysed into smooth fundamental and harmonic components, each of which can be dealt with separately. With this simplifying assumption the input from the array 1 of Fig. 1 to mixer 3 can be described as a wave which varies in accordance with the expression given in Fig. 5($a$), in which $f/2\pi$ is the frequency of the received energy, $p/2\pi$ is the scanning (commutation) frequency, $\theta$ is the angle made with a predetermined reference direction (usually north) by the direction of propagation of the received energy, and $\alpha$ the maximum amount of phase modulation due to the scanning and is equal to $2\pi R/\lambda$, where R is the radius of the circular array and $\lambda$ is the operating wavelength. As the result of the already described mixing and filtering processes in the radio receiver channels there ultimately appears at the output of filter 15 a wave which varies in accordance with the expression given in Fig. 5($b$). In the embodiment of Fig. 1 this wave is phase-demodulated by discriminator 17, which delivers as output a wave which varies in accordance with the expression given in Fig. 5($c$). This discriminator output wave is then divided into two parts for multiplication respectively in multiplier 20 by a reference wave sin $pt$ and in multiplier 21 by a reference wave cos $pt$, the two reference waves being isochronous with the scanning (commutation) but in phase quadrature with each other. This effect of these two multiplications is shown by the equations given in Figs. 5($d$) and 5($e$); the output of multiplier 20 contains a "steady" term proportional to cos $\theta$, and a wave of double the scanning frequency, while the output of multiplier 21 contains a "steady" term proportional to sin $\theta$, and a wave of double the scanning frequency which is in phase quadrature with the corresponding wave from multiplier 20. When these wave multiplier outputs are applied directly to respective quadrature deflecting systems of a cathode ray oscillograph, the two "steady" terms deflect the beam radially from its origin in a direction determined directly by $\theta$, while the two quadrature terms of double the scanning frequency superimpose a circular deflection at twice the scanning frequency, with the result that the display on the screen is basically a circle off-set from the beam origin in a direction governed by $\theta$, the direction of propagation of the received energy, as illustrated in Fig. 1. The direction of off-setting is easily determined by means of a transparent circular alidade which pivots round the origin 25 from a fixed point on its circumference, and which is marked with a diametral line, the alidade being rotated until the diametral line therein is seen to coincide with a diameter of the trace on the oscillograph display.

Figure 3:
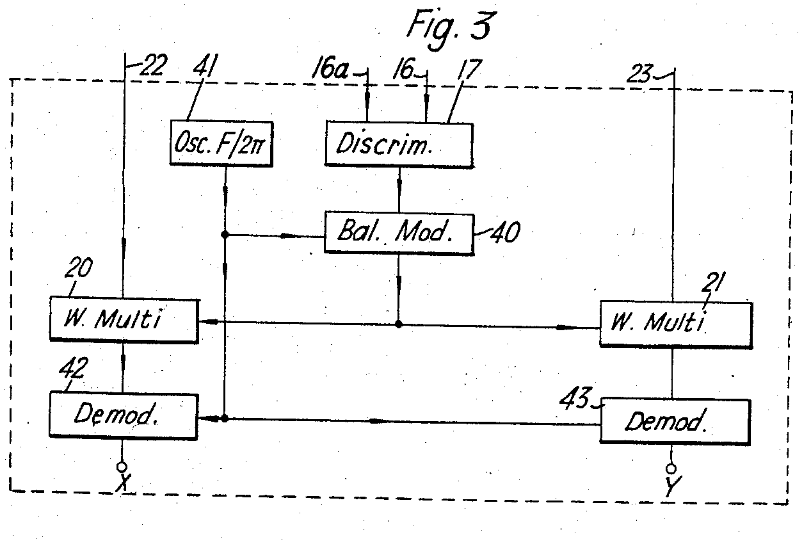
Fig. 3 illustrates an analysing arrangement which may be used in place of that included in Fig. 1.

In the analysing arrangement illustrated in Fig. 4, the input to the discriminator is again a wave which varies in accordance with the expression given in Fig. 5($b$), and the discriminator output is again a wave varying in accordance with the expression given in Fig. 5($c$). In this case however the discriminator output is applied in balanced modulator 40 (Fig. 3) to modulate energy of frequency $F/2\pi$ supplied from oscillator 41. Since the modulator is balanced there is no carrier component in the modulator output, which is confined to the sidebands given by the right-hand side of the equation in Fig. 5($f$). Part of the modulator output energy is applied to wave multiplier 20 for multiplication by the reference wave sin $pt$, the result of this multiplication being a complex wave having four terms as set out in the expression given in Fig. 5($g$). On applying this complex wave to amplitude demodulator 42 together with an unmodulated wave sin $Ft$ from oscillator 41, there is obtained at the output of the demodulator (ignoring proportionality constants) a wave of which the two main terms are given by the expression in Fig. 5($h$), the other terms being of frequency $2F/2\pi$ and $(2F\pm p)/2\pi$ which can be filtered out. Thus the output of demodulator 42 is a wave of the same form as set out in Fig. 5($d$) i. e. as if the discriminator output had been directly multiplied by the reference wave sin $pt$. Similarly it can be shown that the result of multiplying another part of the modulator output by a wave cos $pt$ in multiplier 21, adding a wave sin $Ft$ to the output of multiplier 21, and demodulating the resultant in amplitude demodulator 43, is a wave of which the two main terms are given by the expression in Fig. 5($i$), the other terms being of frequency $2F/2\pi$ and $(2F\pm p)/2\pi$ which can be filtered out as before. Thus the output of demodulator 43 is a wave of the same form as set out in Fig. 5($e$) i. e. as if the discriminator output had been directly multiplied by the reference wave cos $pt$. The two demodulator outputs of the analyser illustrated in Fig. 3 are therefore of exactly the same nature as the output of the two wave multipliers in the analyser 18 shown in Fig. 1.

The analysing arrangement shown in Fig. 4 has the feature that the wave multiplication is performed prior to any phase discriminating action. The input to the analyser is a wave which varies according to the expression given in Fig. 5($b$). Part of this input wave is applied to wave multiplier 20 for multiplication by a reference wave sin $pt$ applied over connection 22. The output of multiplier 20 is a wave of the same frequency and phase modulation as shown in the expression given in Fig. 5($b$) i. e. it is a wave of frequency $P/2\pi$, the amplitude of which varies at a relatively low rate in accordance with the factor sin $pt$. This output is applied to the differential rectifier discriminator 44 together with the delayed wave of the same frequency $P/2\pi$ supplied over connection 16$a$. The output of the discriminator 44 is as usual determined by the phase difference between the two input waves, but is further subject to variation of sign and amplitude in accordance with the factor sin $pt$ i. e. the discriminator output is of the form given by the equation of Fig. 5($d$). Similarly another part of the wave from filter 15 is applied to wave multiplier 21 for multiplication by the other reference wave cos $pt$ applied over connection 23 and is then discriminated against a delayed wave of the same frequency in differential rectifier discriminator 45, the output of which is of the form given by the equation of Fig. 5($e$). The two discriminator outputs of the analyser illustrated in Fig. 4 are therefore of exactly the same nature as the output of the two wave multipliers in the analyser 18 shown in Fig. 1.

Whichever one of the three analysing arrangements hereinbefore described are used, the co-ordinate potentials obtained therefrom, will of course give on the screen of the cathode ray oscillograph an off-set circle display as indicated in Fig. 1. While such display gives the maximum amount of information as to the quality of the signal bearing, it may be simplified by interposing between the analysing terminals and the oscillograph deflecting element low pass filters adapted to cut off twice the scanning frequency. The circle then reduces to a single spot, the polar co-ordinate of which is representative of the signal bearing. This single spot may if desired, be drawn out into a radial line in accordance with well known direction finding technique to give an indication of the pointer type which can be quickly read. If desired, the system may include switching means for cutting in or out the filters just mentioned together with the means of converting the spot into a radial line, so that either the off-set circle diagram or the pointer type diagram can be obtained at will.

While the invention has been described above in connection with particular embodiments, it is to be clearly understood that such description is made only by way of example and not as a limitation of the scope of the invention.

What we claim is:

1. A radio direction-finding system comprising an array of at least three antenna uniformly spaced round the circumference of a circle, radio receiving means, commutating means arranged to couple each of said antenna to said radio receiving means in turn in regular succession round the array at a given commutation frequency, whereby the radio field is scanned in steps round the circumference of said circle at said given frequency, means in said radio receiving means being adapted to derive from the received radio energy a carrier wave which is phase-modulated by reason of said scanning, output means for said derived wave having two output channels with a relative delay in one of said channels substantially equal to the time of one step of said commutation means, means for producing two reference waves isochronous with said scanning but in phase quadrature with each other, and an analysing arrangement, means for applying the waves from said output channels and said reference waves jointly to said analysing arrangement, said analysing arrangement having means including wave multiplying means and phase discriminating means, to derive from said waves two co-ordinate potentials, a direction-indicating device and means for applying said two co-ordinate potentials to said direction indicating device.

2. A system according to claim 1 in which said analysing arrangement comprises means to apply the waves from said two channels to said phase discriminating means, and said wave multiplying means comprises two wave multiplying means each responsive to the output of said phase discriminating means and to a respective one of said two reference waves, the outputs of said two wave multiplying means constituting respective ones of said two co-ordinate potentials.

3. A system according to claim 1, in which said analysing arrangement comprises means to apply the wave from said two channels to said phase discriminating means responsive to the output of said radio receiving means further comprising, a source of energy of frequency high relative to the scanning to the scanning frequency, balanced modulating means for amplitude modulating energy from said source by the output from said phase discriminating means, and in which said wave multiplying means comprises two wave multiplying means responsive each to output from said balanced modulating means and to a respective one of said reference waves, and further comprising two amplitude demodulating means each responsive to unmodulated energy from said source in conjunction with the output of a respective one of said wave multiplying means, the outputs of said two demodulating means constituting respective ones of said two co-ordinate potentials.

4. A system according to claim 1 in which said wave multiplying means comprises two wave multiplying means each responsive to direct output from said two output channels and to a respective one of said reference waves, and said phase discriminating means comprises two phase discriminating means each responsive to the output of a respective one of said wave multiplying means in combination with time-delayed output from said receiving means.

5. A system according to claim 4, in which each of said two phase discriminating means is a phase discriminator of the differential rectifier type.

6. A system according to claim 1 in which said wave multiplying means comprises a pair of like valves each having an anode, a cathode, and at least two control grids, with means for applying each of two waves to be multiplied together to a respective pair of corresponding control grids of said valves in push-pull manner, and means for deriving the wave-product from the anodes of said valves in parallel.

References Cited in the file of this patent

UNITED STATES PATENTS

| | | |
|---|---|---|
| 2,407,281 | Johnson et al. | Sept. 10, 1946 |
| 2,414,798 | Budenbom | Jan. 28, 1947 |
| 2,490,050 | Hansel | Dec. 6, 1949 |
| 2,651,774 | Earp | Sept. 8, 1953 |